Oct. 9, 1962  L. PÉRAS  3,057,447
ELECTROMAGNETIC SYNCHRONIZERS
Filed May 22, 1959

INVENTOR.
LUCIEN PÉRAS
BY
Stevens Davis Miller & Mosher
ATTORNEYS

United States Patent Office 3,057,447
Patented Oct. 9, 1962

3,057,447
ELECTROMAGNETIC SYNCHRONIZERS
Lucien Péras, Billancourt, France, assignor to Regie Nationale des Usines Renault, Billancourt, France
Filed May 22, 1959, Ser. No. 815,035
Claims priority, application France May 31, 1958
4 Claims. (Cl. 192—53)

This invention has for its object an electromagnetic synchronizing device, notably for the gearbox of a vehicle, in which an electromagnet carried by a hub solid with the shaft to be rendered rotatably solid with a pinion mounted for loose rotation on said shaft co-acts with a plate slidably mounted on, but rotatably fast with, said pinion, said hub carrying on its side facing said pinion radial notches adapted drivingly to mesh with corresponding notches formed on the plate when the latter has been attracted by the electromagnet, and after the speeds of these two members have been synchronized by means of synchronizing cones carried on the one hand by the pinion and on the other hand by the hub.

According to another feature of this invention, one of the aforesaid cones is adapted to slide axially to a limited extent against the resistance of a spring, this movement being prevented by stop means as long as the speeds of the two cones are unequal.

The invention will now be described with reference to the attached drawing illustrating diagrammatically by way of example, a typical form of embodiment of the invention.

Figure 1:
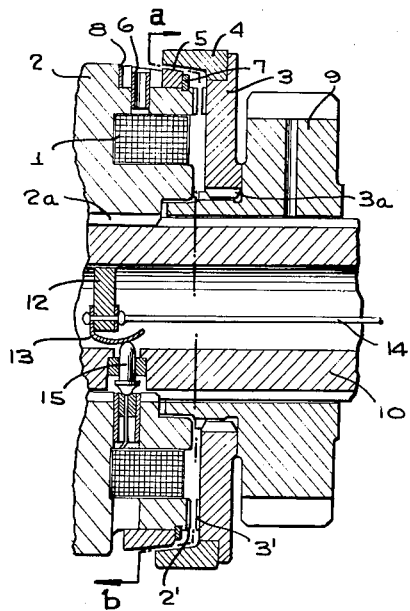
FIGURE 1 is an axial section of the device.
Figure 3:
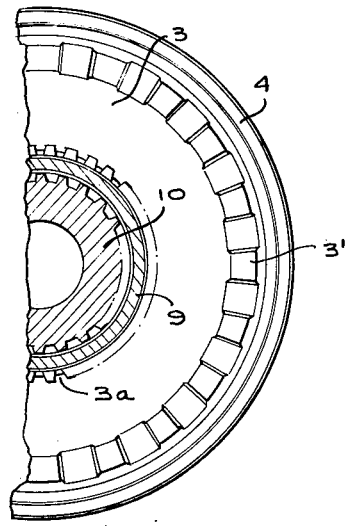
FIGURE 3 is a half front view of the pinion plate as seen in the direction of the arrow "a" of FIG. 1.
Figure 2:
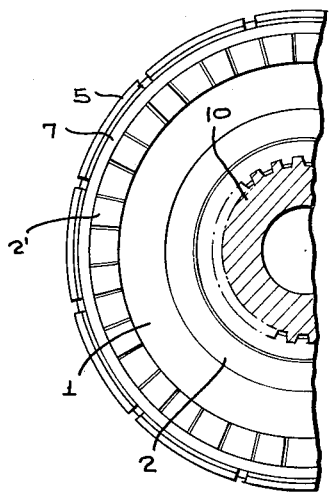
FIGURE 2 is a half front view of the synchronizing hub, as seen in the direction of the arrow "b" of FIG. 1.
Figure 4:
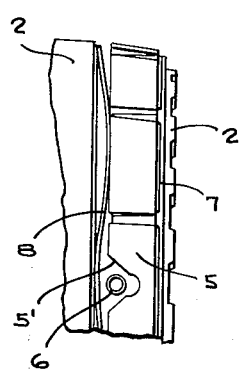
FIGURE 4 is a half lateral view showing the hub synchronizing cone.

Referring to the drawing, FIG. 1 shows the conventional components of a gearbox mechanism, that is to say, a driving pinion 9 mounted for free rotation on a shaft 10 and adapted to be rendered rotatably solid with this shaft at will through the medium of a hub 2 drivingly connected through splines 2a with this shaft.

This splined hub is adapted to receive the driving torque from pinion 9 through the intermediary of an armature-forming plate 3 of which the inner splines 3a are in meshing engagement with corresponding splines carried by said pinion, and of which the front notches and teeth 3′ are adapted to be brought in meshing engagement with corresponding teeth and notches 2′ of the hub 2 which are formed radially on the side face thereof which registers with the pinion, as shown.

The meshing engagement of these notches and teeth 2′ and 3′ is effected by means of the magnetic attraction exerted by an electromagnet 1 housed in the hub and registering with the armature-forming plate 3.

This meshing engagement of the two sets of notches and teeth is only possible when the speeds of pinion 9, on the one hand, and hub 2, on the other hand, have been synchronized by a locking device which become operative when the electromagnet 1 is energized. This synchronizer comprises:

(a) A female cone 4 rotatably solid with the pinion 9 through the medium of plate 3 which is slidably mounted on the splines 3a.

(b) A free male cone 5 carried by the hub and urged toward the plate 3 by a spring 8 but retained by circlips 7; this cone is formed at its larger end with skew notches 5′ adapted, by co-acting with stop pins 6 limiting its rotation, to prevent same from receding in the direction to compress the spring 8 as long as a relative rotation takes place between these two cones as a consequence of the action exerted by the electromagnet attracting the plate 3 and causing therefore the two cones to engage each other, and due to the action of the difference in speed between pinion 9 and shaft 10. When the synchronization is obtained, the two notched and toothed faces 2′ and 3′ contact each other and mesh together so that the torque can be transmitted therethrough.

This form of embodiment should not be construed as limiting the possible applications of this invention, as the transmission of a torque through notched and toothed faces attracted by an electromagnet and becoming rotatably fast with each other after having become synchronized by a locking device may be used to advantage in epicyclic gear trains for either causing two rotary members to become rotatably solid with each other, or causing one or more rotary members to become fast with a fixed case.

The device described hereinabove operates as follows:

Assuming that the device is in its neutral position as shown in the drawing, the electrical contact corresponding to the selection of the gear ratio provided by the mechanism is closed by the driver of the vehicle or by an automatic control system.

The current is led through an electrical conductor 14 and a contact 13 supported at 12 to a contact stud 15 electrically connected to the electromagnet; when the electromagnet 1 is energized the armature plate 3 is attracted and thus caused to slide axially on the splines 3a until the synchronizing cones 4 and 5 contact each other.

When this engagement takes place, the cone 5 urged laterally by the spring 8 is rotatably driven from the cone 4 and abuts against the stop pins 6 through the medium of the skew notches 5′. The electromagnet attraction urges the cone 4 axially toward the cone 5 but the latter engages the pins 6 and therefore cannot recede; thus, at that time any magnetic attraction produced is used only for causing the hub 2 carrying the electromagnet and the driven shaft 10 to rotate at the same speed as the pinion 9.

When this synchronization requirement has been satisfied, the circumferential drive is zero and the cone 5 can slide on pins 6; the spring 8 is compressed due to the axial effort produced by the armature 3 attracted towards the electromagnet of hub 2. The registering faces of the electromagnet and armature contact each other and the notches and teeth 3′, 2′ are thus brought in meshing engagement.

The initial fraction of the engagement is attended by the slipping of the surfaces concerned to the extent necessary for causing the complete relative meshing engagement of the notches and teeth, in case the latter did not mesh completely at the time of their initial contact.

As the electromagnet remains energized, the attraction exerted when the parts stick together is sufficient for preventing in any case the release of the driving notches and teeth, and thus the driving engagement between the shaft 10 and pinion 9 is obtained.

If necessary, for example as required by the size of the components involved, the attraction exerted on the armature 3 may be increased momentarily during gear shifts by delivering an overcurrent to the electromagnet windings through a time-lag relay or a limit-switch device.

These last-mentioned devices may be used with a view to spare current in electomagnets operating continuously.

While we have shown and described the fundamental novel features of this invention as applied to a single form of embodiment, it will be readily understood by anybody conversant with the art that various omissions and substitutions and changes in the form, details and relative proportions of the device illustrated and in its operation may be made by those skilled in the art without departing from the spirit and scope of the invention.

I claim:

1. A synchronizing clutch device comprising a driven shaft and a pinion mounted for loose rotation on said shaft, a hub fixedly circumposed on the shaft along side of and spaced from the pinion, said hub having a side facing the pinion provided with alternating radial notches and teeth, a plate rotatable with the pinion and interposed between the hub and the pinion and having a side facing the hub and provided with alternating radial teeth and notches complementary to the teeth and notches on the hub, means mounting the plate for rotation with the pinion and for relative sliding movement axially of the shaft, an electromagnet carried by said hub for attracting the plate to move it toward the hub and synchronizing means, including interengaging cones carried by the hub and the plate, for causing the driven shaft and pinion to rotate at the same speed prior to intermeshing of the teeth and notches on the plate and on the hub.

2. A device as claimed in claim 1, wherein one of the cones is mounted for movement axially of the shaft and locking means is provided for maintaining said movable cone in an advanced position to prevent the intermeshing engagement of the complementary teeth and notches until the synchronization is accomplished.

3. A device as claimed in claim 2, wherein the movable cone is carried by the hub, spring means urging said movable cone toward the plate and abutment forming means resisting said movement, said movable cone being formed on its rear portion with notches and locking pins secured on the hub for coaction with said notches on said movable cone.

4. A synchronizing clutch apparatus between a pair of relatively rotating members comprising a first member and a second member, said members being disposed alongside of each other in spaced relation, said first member having a side facing the second member provided with alternating radial teeth and notches, a plate rotatable with the second member and interposed between the first and second members and having a side facing the first member and provided with alternating radial teeth and notches complementary to the teeth and notches on the first member, means mounting the plate for rotation with the second member and for axial sliding movement relative thereto, an electomagnet carried by the first member for attracting the plate to move it toward the first member and synchronizing means, including interengaging cones carried by the first member and the plate.

References Cited in the file of this patent

UNITED STATES PATENTS

| | | |
|---|---|---|
| 1,049,957 | Whitcomb | Jan. 7, 1913 |
| 1,756,907 | Payne | Apr. 29, 1930 |
| 2,070,140 | Peterson et al. | Feb. 9, 1937 |
| 2,338,428 | Guter et al. | Jan. 4, 1944 |
| 2,467,987 | Peterson et al. | Apr. 19, 1949 |
| 2,554,740 | Jellis et al. | May 29, 1951 |
| 2,861,665 | Passler | Nov. 25, 1958 |
| 2,940,570 | Thielmann | June 14, 1960 |

FOREIGN PATENTS

| | | |
|---|---|---|
| 67,013 | Austria | May 10, 1913 |
| 37,818 | France | Jan. 24, 1931 |
| | (1st addition to 685,198) | |